United States Patent [19]

Deegan

[11] Patent Number: 5,040,364
[45] Date of Patent: Aug. 20, 1991

[54] LAWN MOWER HAVING SELECTIVE DISCHARGE MEANS

[76] Inventor: John H. Deegan, 22 Riverview, Port Ewen, N.Y. 12466

[21] Appl. No.: 483,663

[22] Filed: Feb. 23, 1990

[51] Int. Cl.⁵ ............................................ A01D 34/68
[52] U.S. Cl. ............................. 56/320.2; 56/DIG. 18; 56/DIG. 24
[58] Field of Search ................... 56/320.2, 320.1, 17.4, 56/17.5, DIG. 2, DIG. 5, DIG. 18, DIG. 20, DIG. 24

[56] References Cited

U.S. PATENT DOCUMENTS 2,726,503 12/1955 Phelps ................................ 56/320.2
2,857,727 10/1958 Cole .................................... 56/320.2
4,107,907 8/1978 Rutherford ........................... 56/17.4

Primary Examiner—Terry L. Melius
Attorney, Agent, or Firm—Iman Abdallah

[57] ABSTRACT

A lawn mower having a plurality of discharge exit ports and exit port closure means disposed about the periphery of the housing member of said lawn mower. Each closure means is selectively and individually operable between a fully closed position and a fully open position by a control lever disposed on the handle of the lawn mower to provide means for selective discharge of cut grass by the operator while standing behind the lawn mower and while the lawn mower is being propelled.

2 Claims, 2 Drawing Sheets

LAWN MOWER HAVING SELECTIVE DISCHARGE MEANS

BACKGROUND OF THE INVENTION

The present invention generally relates to discharge means for lawn mowers. More specifically, the present invention relates to means for selective discharge of the cut grass and the like from a push handle operated rotary type mower having multiple exit ports.

Various rotary type lawn mowers have been described in the prior art having multiple discharge exit ports, for examples, U.S. Pat. No. 2,726,503 to Phelps and U.S. Pat. No. 2,857,727 to Cole. The Phelps invention also discloses a slidably mounted closure covering for the discharge exit ports that can be adjusted to vary the size of the exit port. In U.S. Pat. No. 4,258,539 to Pearce et al. there is disclosed a lawn mover having a side discharge that is closed by attachment of a discharge chute mounted on the top of the lawn mower housing for alternative discharge means. There remains a need in the prior art which is solved by the invention of the present disclosure for means to selective discharge grass clippings and the like to the various sides of a lawn mower by operation of control means disposed on the handle of the mower.

SUMMARY OF THE INVENTION

The present invention discloses an improved means of discharging the cut grass clippings and the like from a push handle operated rotary type lawn mower comprising a plurality of discharge exit ports having selectively controllable closure means for each exit port individually which are operable while the lawn mower is being operated and pushed during cutting operations. A plurality of discharge exit port controls are disposed on the push handle of the lawn mower thereby permitting selective opening and closing of the discharge exit port closure means by the operator while standing behind the lawn mower.

An object of the present invention is to provide a lawn mower having a plurality of discharge exit ports which permit the selective discharge of cut grass clippings and the like to the front or either side of the mower.

It is also an object of this invention to provide improved safety in the operation of a lawn mower having multiple discharge exit ports with closure means by providing means to operate said closure means while standing behind the handle of the lawn mower.

These and other objects and advantages of the present invention will be apparent to those skilled in the art from the following description of a preferred embodiment, claims and appended drawings.

DESCRIPTION OF A PREFERRED EMBODIMENT

Figure 1:
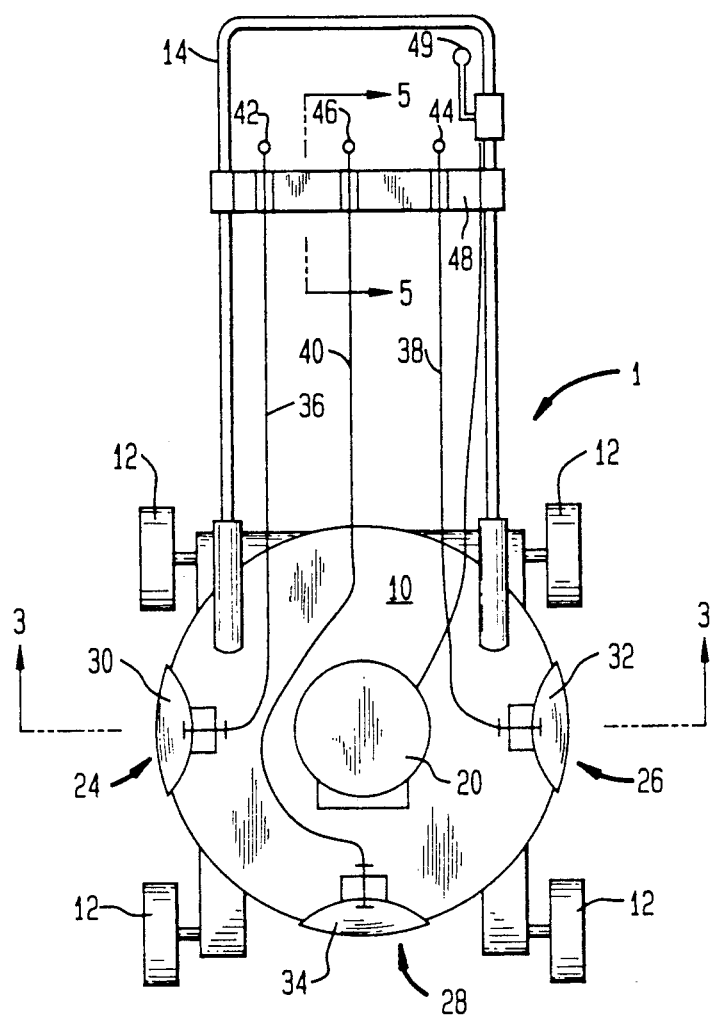
FIG. 1 is a top plan view of a lawn mower constructed in accordance with the teachings of the present invention.
Figure 2:
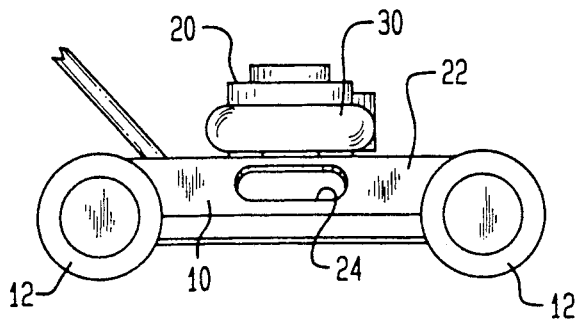
FIG. 2 is a partially fragmented side plan view of the lawn mower shown in FIG. 1 shown with a discharge exit port shown in its fully open position.
Figure 3:
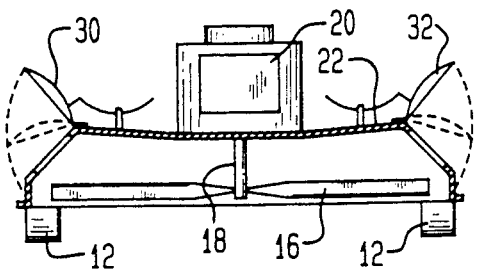
FIG. 3 is a cross-sectional view taken along line 3—3 of FIG. 1.

FIG. 1 illustrates in a top plan view a lawn mower 1 constructed in accordance with the teachings of the present invention. The lawn mower generally comprises a housing member 10 having a plurality of wheels 12 attached to the sides of said housing member 10 and a push handle 14 for manual propulsion of the lawn mower 1. A mower blade 16 is rotatably attached to a motor 20 by means of a vertically extending shaft 18 as generally known in the prior art, said motor 20 being disposed above the deck 22 of said housing member 10 and said blade 16 being disposed below said deck 22 (FIG. 3). A plurality of discharge exit ports 24, 26, 28 are disposed about the periphery of said housing member 10, a first side discharge exit port 24 being disposed to one side of said housing member 10, a second side discharge exit port 26 being disposed to the opposite side of said housing member, and a front discharge exit port 28 being disposed to the front of said housing member. Exit port closure means 30, 32, 34 are respectively provided for said first side discharge exit port 24, said second side discharge exit port 26, and said front discharge exit port 28. The respective exit port closure means 30, 32, 34 are hingedly attached to the housing member 10 adjacent to the respective discharge exit ports 24, 26, 28 and each closure means 30, 32, 34 is operable individually to various positions between the fully open and fully closed positions (FIG. 3) by operation of respective control levers 42, 44, 46 disposed on a bar 48 which is fixedly attached to said handle 14 proximal to the motor control means 49 generally found on the lawn mowers of the prior art. Control cables 36, 38, 40 respectively interconnect said control levers 42, 44, 46 and said discharge exit port closure means 30, 32, 34. A lawn mower 1 constructed as heretofore described permits the selective and individual operation of the respective closure means 30, 32, 34 by the operator of the lawn mower 1 while standing behind the handle 14 of the lawn mower 1 which permits operation of the closure means 30, 32, 34 while pushing the mower 1 and without the operator having to move close to a revolving blade 16. Thus more flexibility in the discharge of cut grass clippings is attainable by the use of a lawn mower 1 constructed in accordance with the teachings of the present disclosure.

Figure 4:
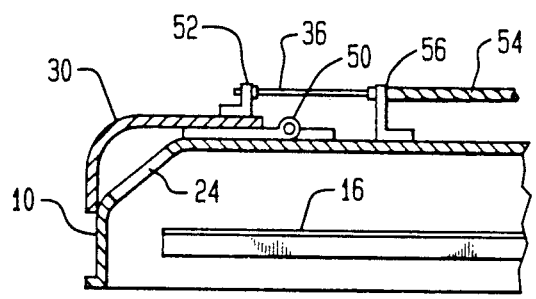
FIG. 4 is an enlarged fragmentary view of FIG. 3 shown with a discharge exit port shown in its fully closed position.
Figure 5:
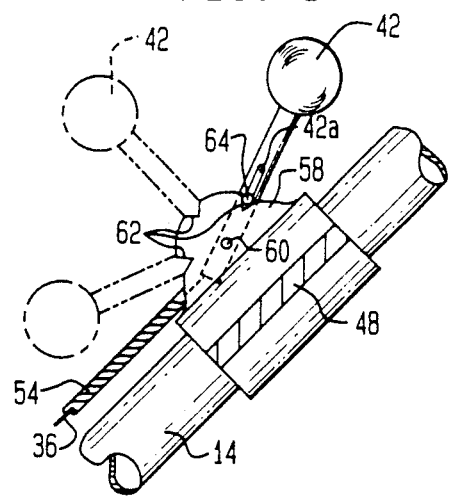
FIG. 5 is a cross-sectional view taken along line 5—5 of FIG. 1.

Referring now to FIGS. 4 and 5 there is shown in greater detail, for illustration purposes only, the attachment of said first side discharge exit port closure means 30 to said housing member 10 and the operation and structure of the related control lever 42. The details shown in FIGS. 4 and 5 are typical for the other exit port closure means 32, 34 and control levers 44, 46. The first closure means 30 is mounted by a hinge 50 to the deck 22 of said housing member in a position to close the first side discharge exit port 24 when disposed in its fully closed position. A first control cable 36 is attached to said first closure means 30 via a bell-crank lug 52 fixedly attached to said first closure means 30. The first control cable 36 is slidably disposed within a first cable sheath 54 which is fixedly attached to the deck 22 of said housing member 10 by means of a sheath bracket 56. Referring now to FIG. 5 it can be seen that the opposite end of said first cable sheath 54 and the enveloped first control cable 36 extend to said first control lever 42. First control lever 42 is pivotally attached about a pin 60 to a first control lever bracket 58 which is integrally constructed with said bar 48. Bracket 58 includes a plurality of notches 62 disposed in spaced relationship along the periphery of said bracket 58. A spring-loaded detent 64 is disposed in a longitudinal slot 42a formed in said lever 42 and said detent 64 engages the notches 62 of said bracket 58 to lock the closure means 30 in various positions, the lever 42 being pivotal to corresponding various positions as indicated by the fade lines.

Figure 6:
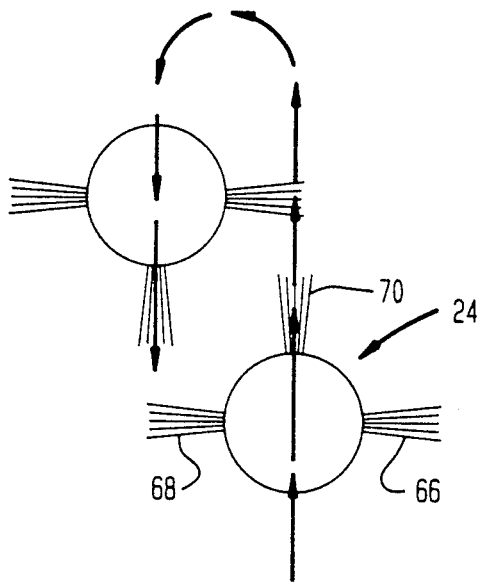
FIG. 6 is a diagrammatic representation of the cut grass distribution when all discharge exit ports are open.
Figure 7:
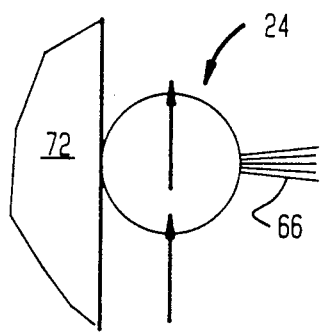
FIG. 7 is a diagrammatic representation of the cut grass distribution when only a single side discharge exit port is open.
Figure 8:
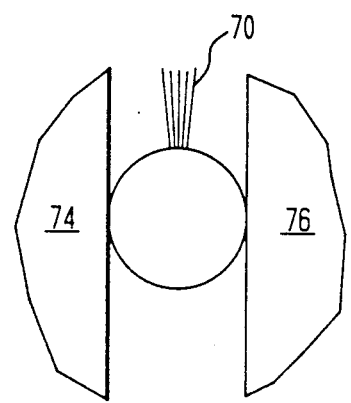
FIG. 8 is a diagrammatic representation of the cut grass distribution when only the front discharge exit port is open.
Figure 9:
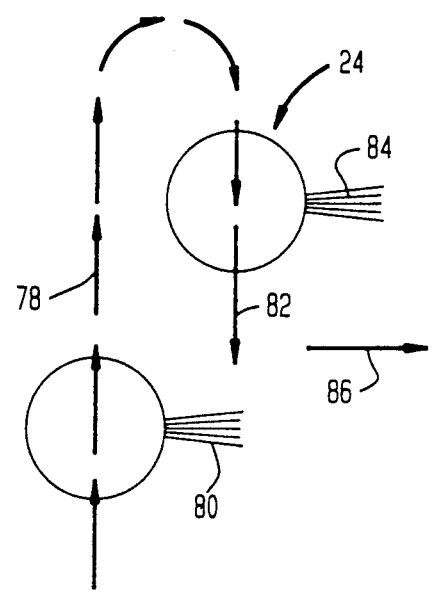
FIG. 9 is a diagrammatic representation of the use of the lawn mower of the present invention to discharge cut grass to the same side of a lawn on subsequent parallel swaths in opposite directions.

FIGS. 6-9 illustrate in diagrammatic representations the flexibility in the discharge of cut grass clippings and the like afforded by a lawn mower 1 constructed in accordance with the teachings of the present disclosure. The arrow in FIGS. 6, 7 and 9 indicate the direction of manual propulsion of the mower 1. In FIG. 6 operation of the mower 1 in alternate directions along parallel paths is illustrated with all of the discharge exit port closure means 30, 32, 34 in the fully open position. As shown at 66, 68, and 70 the discharge will be directed in a broad pattern for even distribution on the lawn. FIG. 7 illustrates operation of the mower 1 with only the first discharge exit port closure means 30 in its open position. This disposition of the closure means 30, 32, 34 permits the selective discharge of the cut grass away from a wall or walk area. In FIG. 8 both said first side discharge closure means 30 and said second side discharge closure means 32 are closed and only the front discharge closure means 34 is opened. In such a case the cut grass may be repeatedly cut to mulch size pieces. FIG. 9 illustrates the operation of the lawn mower 1 of the present invention and alternately opening opposing side discharge closure means 30 and a particular advantage of the present disclosure in sequentially discharging cut grass to one side of a lawn. The mower 1 is first pushed along path 78 with only the first side discharge exit port closure means 30 opened which discharges the cut grass to the right as indicated by the numeral 80. When the operator turns the first side discharge exit port closure means 30 is closed and the second side discharge exit port closure means 32 is opened. As the operator proceeds along path 82 the previously cut grass clippings are cut again and discharged again to the right as indicated by the numeral 84. Thus by sequential operation of the mower 1 in this manner the cut grass is always discharged in the same direction as indicated by the arrow 86.

While the preferred embodiment of the present invention has been described and shown in conjunction with a push handle type rotary mower, it should be understood that the teachings of the present disclosure are equally applicable to a self-propelled or riding type lawn mowers with minor modifications without departing from the spirit and scope of the present invention as held in the appended claims.

Therefore in view of the foregoing, I claim:

1. A lawn mower including
a housing member,
a motor,
a rotating blade disposed below said housing member,
a push handle disposed at the rear of said housing member, and motor control means disposed on said handle,
said housing member including a plurality of discharge exit ports disposed about the periphery of said housing member, said discharge exit ports having respective closure means which are selectively and individually operable between a fully closed position and a fully open position by control means disposed on said handle proximate to said motor control means thereby providing means for operation of said closure means by an operator of the lawn mower while standing behind the push handle, wherein a first discharge exit port and corresponding closure means are disposed to a side of said housing member, a second discharge exit port and corresponding closure means are disposed to the opposite side of said housing member, and a front discharge exit port and corresponding closure means are disposed to the front of said housing member, each of said first side closure means said second side closure means, and said front closure means having separate and individually operable control means,
said closure means being attached to said housing member by means of a hinge mounted to the deck of said housing member and said control means comprising a control cable attached at one end to said closure means via a bell-crank lug fixedly attached to said closure means, said control cable being slidably enveloped within a cable sheath fixedly attached at one end to the deck of said housing member by means of a sheath bracket, the opposite end of said cable sheath and the enveloped control cable extending to a control level pivotally attached about a pin in a control lever bracket integrally constructed with a bar fixedly attached to said handle, said bracket including a plurality of notches disposed in spaced relationship along the periphery of said bracket, a spring-loaded detent being disposed in a longitudinal slot formed in said control lever, said detent engaging the notches of said bracket to lock said closure means in various positions.

2. A method of cutting a lawn with a lawn mower as described in claim 1 comprising the sequential steps of:
opening said first side closure means by operation of said first control lever;
pushing said lawn mower along a path on the lawn;
closing said first side closure means by operation of said first control lever;
turning said lawn mower in the opposite direction to the side of the lawn to which the cut grass was discharged when said first side closure means was opened;
opening said second side closure means by operation of said second control lever;
pushing said lawn mower along a path parallel to the path cut when said first side closure means was open;
repeating in sequence the aforementioned steps at each turn of the lawn mower.

* * * * *